United States Patent [19]

Prince et al.

[11] Patent Number: 5,308,648
[45] Date of Patent: May 3, 1994

[54] SPRAY APPLICATION OF PLASTICS ADDITIVES TO POLYMERS

[75] Inventors: William D. Prince, Charleston; George E. Keller, II, S. Charleston, both of W. Va.; William A. Fraser, Mahopac; Pak S. Leung, Highland Mills, both of N.Y.

[73] Assignee: Union Carbide Chemicals & Plastics Technology Corporation, Danbury, Conn.

[21] Appl. No.: 954,391

[22] Filed: Sep. 30, 1992

[51] Int. Cl.$^5$ .............................................. B05D 7/00
[52] U.S. Cl. .................................. 427/212; 427/222; 427/421; 427/427
[58] Field of Search ................. 427/421, 212, 222, 427

[56] References Cited

U.S. PATENT DOCUMENTS

| | | | |
|---|---|---|---|
| 4,252,844 | 2/1981 | Nesgood et al. | 427/213 |
| 4,487,858 | 12/1984 | Lovgren et al. | 523/348 |
| 4,820,752 | 4/1989 | Berens et al. | 523/340 |
| 4,880,470 | 11/1989 | Hyche et al. | 106/271 |
| 4,882,107 | 11/1989 | Cavender et al. | 264/51 |
| 4,898,616 | 2/1990 | Hyche et al. | 106/271 |
| 4,923,720 | 5/1990 | Lee et al. | 427/422 |
| 4,960,617 | 10/1990 | Chatterjee et al. | 427/222 |
| 4,960,644 | 10/1990 | Hyche et al. | 428/407 |
| 4,975,120 | 12/1990 | Hyche et al. | 106/271 |
| 5,007,961 | 4/1991 | Hyche et al. | 106/18 |
| 5,027,742 | 7/1991 | Lee et al. | 118/300 |
| 5,041,310 | 8/1991 | Williams et al. | 427/222 |
| 5,057,342 | 10/1991 | Hoy et al. | 427/422 |
| 5,066,522 | 11/1991 | Cole et al. | 427/422 |
| 5,096,493 | 3/1992 | Hyche | 106/271 |
| 5,108,799 | 4/1992 | Hoy et al. | 427/422 |

FOREIGN PATENT DOCUMENTS

| | | |
|---|---|---|
| 222207 | 5/1987 | European Pat. Off. |
| 331419 | 9/1989 | European Pat. Off. |
| 350910 | 1/1990 | European Pat. Off. |
| 407138 | 1/1991 | European Pat. Off. |
| 411628 | 2/1991 | European Pat. Off. |
| 420181 | 4/1991 | European Pat. Off. |
| 9002770 | 3/1990 | PCT Int'l Appl. |

OTHER PUBLICATIONS

Chem. Abstr. 113:174645f; Homogeneous Nucleation in Supercritical Fluids; Debenditti, Pablo; AIChE J., 36(9), 1289-98, 1990.
Chem. Abstr. 113:154288p; Supercritical fluid spray technology. An emission control technology for the future. Kenneth L. Hoy, Marc Donohue. Polym. Prepr. 31(1), 679-80, 1990.
Chem. Abstr. 112:237587r; Granulation of organic substances using supercritical fluids. Tauchi, et al., Jpn. Kokai Tokkyo Koho, 4 pp., 1989.
Chem. Abstr. 112:58282r; Supercritical fluids as diluents in liquid spray application of coatings and apparatus therefor. Lee, et al., Eur. Pat. Appl., 21 pp., 1989.
Chem. Abstr. 111:197472v; Solids formation after the expansion of supercritical mixtures. Mohamed, et al., aCS Symp. Ser., 406, 355-78, 1989.
Chem. Abstr. 109:152362b, Supercritical fluid molecular spray thin films and fine powders., Richard D. Smith, U.S., 25 pp. Cont.-in-Part of U.S. Pat. No. 4,582,731., 1988.
Chem. Abstr. 108:155263k; Production of fine powders by the rapid expansion of supercritical fluid solutions, Matson, et al., Adv. Ceram., 21(Ceram. Powder Sci.) 109-20. 1987.
Chem. Abstr. 105:197085x. Properties and dissolution of drugs micronized by crystallization from supercritical gases. Loth, H., Hemgesberg, E.; Int. J. Pharm., 32(2-3), 265-7, 1986.
Chem. Abstr. 105:63102s. Formation of silica powders

(List continued on next page.)

*Primary Examiner*—Shrive Beck
*Assistant Examiner*—David M. Maiorana
*Attorney, Agent, or Firm*—B. L. Deppenbrock

[57] ABSTRACT

A process for applying a polymer additive material to a polymeric substrate includes the steps of a) forming in a closed pressurized system a mixture of a solid polymer additive material, a suitable liquid carrier material, and a suitable viscosity reducing material, and b) spraying this mixture onto a polymeric substrate.

7 Claims, 2 Drawing Sheets

OTHER PUBLICATIONS from the rapid expansion of supercritical solutions. Matson, et al., Adv. Ceram. Mater., 1(3), 242-6, 1986.

Chem. Abstr. 104:227104b. Supercritical fluid molecular spray film deposition and powder formation. Richard D. Smith. 1986.

Derwent Abstr. No. 91-266510/36. Uniformly coating polymer particles with additives esp. stabilizers . . . etc.; Williams, et al., U.S. Pat. No. 5,041,310. 1991.

Derwent Abstr. No. 91-010095/02. Prodn. of coating stabilizer particles-for addn. to olefin polymerization, . . . etc., Chatterjee, A. M., EP 407138A, 1991.

Derwent Abstr. No. 89-229264/32. In reactor stabilization of polyolefin(s) via coating stabilizers, . . . etc., Chatterjee, A. M., U.S. Pat. No. 4,879,141. 1989.

Derwent Abstr. No. 88-002577/01. Graphite micro-powder prodn. . . . etc., Showa Denko KK., J 62 265111-A., 1987.

Derwent Abstr. No. 87-137324/20. Infusion process for incorporating additives into solid polymers . . . etc., Berens, et al., EP 222207A, 1987.

Derwent Abstr. No. 78-30747A/17. Adhesion of powder additives to polymer pellets. Nippon Ester KK., J53026841A, 1978.

Derwent Abstr. No. 75-46090W/28. Incorporation of additives into thermoplastics . . . etc., 1975.

SPRAY APPLICATION OF PLASTICS ADDITIVES TO POLYMERS

FIELD OF THE INVENTION

This application relates to introduction of plastics additives into polymeric materials, and more particularly, to a process for the spray application of plastics additives to polymeric materials.

BACKGROUND

In the manufacture of products using thermoplastic resins such as polyolefins, various additives are generally included in the resin to affect color, to ease processability, and to inhibit oxidation and other types of degradation, to stabilize the physical characteristics of the resin and thus prolong the life expectancy of the product.

For maximum effectiveness, it is important that any additive be uniformly distributed in the thermoplastic resin. Poorly distributed additives may contribute to unsatisfactory properties in the final product, such as reduced tensile and tear strengths, reduced resistance to low temperature flexing, reduced elongation characteristics, reduced breakdown voltage strengths of dielectric materials, and electrical losses caused by an increased power factor and increased dielectric constant.

The physical form of plastics additives can determine the efficiency and economics of their introduction into the thermoplastic material. For example, fine powders tend to be fairly readily dispersed but are difficult to handle and can cause environmental problems. They are also difficult to introduce continuously into process equipment.

In practice, a number of procedures have been employed to incorporate solid additives into polymeric systems. Conventional additive delivery systems use dry additive feeding and mixing with polymer resins, in which dry plastic additives are metered and mixed with polymer particles in blenders or mixers. Alternatively, dry additives are mixed with a resin as it is processed through a pelletizer, extruder, or compounding device. In another process, the additives are melted and coated on plastic resin particles before introducing them into an extruder. High melting additives are difficult to control in this technology. In yet another process, resin particles are coated with an aqueous emulsion of the additives, then dried. This procedure is not suitable for hydrolyzable additives such as many phosphite antioxidants, and the water must ultimately be removed, resulting in complexity and expense. Other methods involve, for instance, dissolving additives in one or more of the components of the mixture to be polymerized before the polymer is formed, or mixing the additive in a solution, suspension, or emulsion of the polymer and then removing the solvent or suspending agent.

The literature also contains descriptions of spray procedures for introducing plastics additives into polymeric materials, and for spraying various other materials in supercritical carbon dioxide. A number of these references are discussed briefly below.

U.S. Pat. No. 5,007,961 and corresponding PCT application WO 90/02770 disclose aqueous systems for applying additives to polymeric particles, as well as methods for applying such additive systems such as spraying, wiping, or dipping, and polymeric particles treated with such additive systems. The additive systems comprise an emulsified wax, surfactant, base, one or more functional polymer additives, and water.

European patent application 411,628 discloses stabilizing polyolefins in non-extruded as-polymerized particle form by depositing on the particles a mixture of stabilizers including one or more organic phosphites or phosphonites and one or more phenolic antioxidants. Optional ingredients are thioethers, organic polysulfides, hindered amine light stabilizers, benzophenone and benzotriazole derivatives, and diluents such as paraffins, cycloparaffins, epoxidized soybean or linseed oil, silicone oils, and olefin oligomers. The stabilizer mixtures are applied, in a melted state or in a liquid state by virtue of containing liquid phosphites or phosphonites, by a continuous or batch mixer optionally equipped with a spraying mechanism.

U.S. Pat. No. 5,041,310 of Williams discloses a coating composition comprising a mixture of polymer additives, gelling agent, and oil, which is applied as a liquid to the surface of particles of polymer, and caused to gel.

U.S. Pat. No. 4,960,617 discloses a process for post-reactor stabilization of polyolefins by melting a polyolefin wax, blending at least one additive into the resulting melt, fluidizing polyolefin particles to be stabilized with hot gas, and spraying the liquid polyolefin wax containing at least one additive on the fluidized polyolefin particles.

U.S. Pat. No. 4,882,107 discloses a method and apparatus for spraying a solution, suspension, or dispersion of a mold release material in a supercritical fluid such as supercritical carbon dioxide onto the surface of a mold, to coat it with the release agent.

U.S. Pat. Nos. 4,923,720 and 5,027,742 and Chemical Abstract 113:154288p disclose a process and apparatus in which supercritical fluids such as supercritical carbon dioxide are used to reduce the viscosities of viscous coating compositions to permit their application as liquid sprays.

U.S. Pat. No. 5,066,522 discloses the use of supercritical fluids such as supercritical carbon dioxide as diluents in liquid spray applications of adhesives.

European patent application 350,910 discloses liquid spray application of coatings with supercritical fluids as diluents, and spraying from an orifice.

Production of fine powders in inorganic oxides and certain drugs by rapid expansion of supercritical fluid solutions has been reported. See Chemical Abstracts 108:155263k, 105:197085x, 105:63102s, and 104:227104b. Graphite has also been produced in a micro-powder form by wetting it with liquid $CO_2$ then vaporizing the $CO_2$ at a temperature and pressure above the critical point of $CO_2$ gas. See Japanese patent publication 62/265111. However, it does not appear that particle size reduction of plastics additives in nonvolatile liquid matrices upon spraying in supercritical $CO_2$ has been reported.

Despite the progress made in applying polymer additives to polymers in spray processes, indicated by the references discussed above, prior art processes generally suffer from certain deficiencies. Some liquid systems have high viscosities which make them difficult to atomize without heating, dilution, use of a high amount of atomization gas, and/or use of relatively high pressures for spraying. Systems which involve the spraying of materials which are solids under standard conditions can experience difficulties related to handling or melting of the solids, and plugging of lines as a result of resolidification of the solid materials in vessels, piping, and the spray nozzle. Such operational difficulties can make the spraying operation inefficient, adversely affecting not only its economics, but also the control of the amounts of the additives and the uniformity of their application to the polymer being treated. An improved spray process for applying plastics additives to polymers would be very desirable. Such a process is the subject of this application.

SUMMARY

The process of the present invention involves the steps of 1) forming in a closed pressurized system a mixture comprising: a) at least one polymer additive material which is a solid under standard conditions of temperature and pressure; b) at least one liquid carrier material capable of dissolving, suspending, or dispersing the polymer additive material; and c) at least one viscosity reducing material which is i) a fluid under the pressure of the closed pressurized system, ii) at least partially soluble in the liquid carrier material, iii) present in the mixture in an amount which is effective to cause the mixture to have a viscosity which renders it sprayable, and iv) volatile under standard conditions of temperature and pressure; and 2) spraying the mixture onto a polymeric substrate.

This process enables manufacturers of plastic items to introduce mixtures of plastics additives onto resins in a convenient liquid form, thereby avoiding the problems of handling, dusting, agglomeration, and metering or measuring associated with dry solids. No volatile solvent or water is incorporated into the polymeric substrate. Reduction of solid particle size occurs upon spraying of a number of plastics additives. The spraying aspect of the process provides both improved control of the amounts of additives applied and the uniformity of their incorporation into the polymer.

BRIEF DESCRIPTION OF THE DRAWINGS

The invention will be more completely understood from a consideration of the following detailed description taken in conjunction with the drawing, in which.

DETAILED DESCRIPTION

Polymer additive materials, otherwise referred to as polymer additives, are materials which are suitable for inclusion in polymers to affect their properties or processing characteristics. In other words, they are compounds which affect or modify the properties of a polymeric system of which they are a part. Depending of their chemical constitutions, they may act as antioxidants, neutralizers, metal or catalyst deactivators, slip agents, light stabilizers, antiblocking agents, colorants, lubricants, flame retardants, coupling agents, processing aids, antistatic agents, nucleating agents, blowing agents, etc.

Examples of antioxidants include, but are not limited to: hindered phenols, phosphites, and propionates. Examples of hindered phenols are 1,3,5-trimethyl-2,4,6-tris-(3,5-di-tert-butyl-4-hydroxybenzyl)benzene; octadecyl-3-(3,5-ditert-butyl-4-hydroxyphenyl)propionate; tetrakis [methylene-3(3',5'-di-tert-butyl-4'-hydroxyphenyl)-propionate]methane); 4,4'-butylidene-bis(5-methyl-2-t-butyl)phenol; and 2,2'-ethylidene-bis-(4,6-di-tert-butylphenol). Examples of phosphite andioxidants are tris(2,4-di-tert-butyl-phenyl)phosphite; bis(2,4-di-t-butyl-phenyl) pentaerythritol diphosphite; and 2,2'-ethilidene-bis(4,6-di-t-butylphenyl)fluorophosphite. Examples of propionate antioxidants are dilaurel thiodipropionate and distearyl thiodipropionate.

Examples of neutralizers/catalyst deactivators include, but are not limited to: zinc oxide, zinc stearate, fatty amines and fatty amides such as those sold by a division of Witco Chemical Company under the KEMAMINE label; 3,5-bis(1,1-dimethyl-ethyl)-4-hydroxy-benzene propanoic acid; 2-[3[3,5-bis-(1,1-dimethylethyl)-4-hydroxy phenyl]-1-oxopropyl]hydrazide; molecular sieve, and hydrotalcites.

Examples of slip agents include, but are not limited to: erucamide, oleamide, and ethylene bis-stearamide.

Examples of light stabilizers include, but are not limited to: benzophenone stabilizers, such as those sold under the tradenames CYASORB-UV 2018 (American Cyanamid), UVINUL M40 and UVINUL 490 (BASF Corporation), hindered amine compounds such as those containing tetraalkyl-piperidinyl functionality, including UV absorbers marketed by Ciba Geigy under the tradenames TINUVIN 144, TINUVIN 326, TINUVIN 327, TINUVIN P, TINUVIN 622LD, and TINUVIN 770 (N,N-diphenyl-N,N-di-2-naphthyl-p-phenylenediamine), American Cyanamid's CYANOX 3346, and FAIRMONT MIXXIM AO-30.

Examples of blowing agents are: azodicarbonamide and sodium bicarbonate. An example of a nucleating agent is dibenzylidine sorbitol.

Examples of antiblocking agents are diatomaceous silica, clay, and talc.

Examples of colorants are titanium dioxide, carbon black, and organic dye pigments.

Examples of lubricants are organomodified polydimethylsilioxanes such as UCARSIL PA-1 processing aid and polyalkylene glycols such as UCON ® lubricant LB-285, available from Union Carbide Chemicals and Plastics Company Inc., and calcium stearate.

Examples of processing aids are calcium stearate and organomodified polydimethylsilioxanes such as UCARSIL ® PA-1 processing aid.

Examples of antistatic agents are glycerol monostearates, etholated amines, polyethylene glycol esters, and quaternary ammonium compounds.

Standard conditions of temperature and pressure means 25° C. and one atmosphere pressure.

Liquid carrier materials useful in the process of the invention, otherwise referred to as liquid carriers, are materials which are capable of dissolving, suspending, or dispersing polymer additives. They may be functional or nonfunctional fluids, and are substantially nonvolatile under standard conditions of temperature and pressure.

Examples of functional liquid carriers are organomodified polysiloxanes such as Union Carbide's UCARSIL ® PA-1 processing aid, liquid phosphite stabilizers such as Borg Warner's WESTON 399B, alpha tocopherol (vitamin E), ditridecylthiopropionate, trisnonylphenylphosphite, ethoxylated fatty amines, alkylated diphenylamines, and alkyllauryl polyether phosphate esters. Examples of nonfunctional liquid carriers include, but are not limited to: polyethers such as polyethylene glycols and polyalkylene glycol lubricating oils such as Union Carbide's UCON ® lubricant LB-285; hydrocarbons such as mineral oils, poly alpha olefins, polypropylene oils; and polyesters such as sorbitan monooleate and glycerol trioleate. These are relatively low surface energy materials.

Viscosity reducing materials suitable for use in this invention are compressed fluids such as supercritical fluids and subcritical compressed fluids.

As used herein, the term "compressed fluid" means a fluid which may be in its gaseous state, its liquid state, or a combination thereof, or is a supercritical fluid, depending upon (1) the particular temperature and pressure to which it is subjected upon admixture with the solvent-borne composition that is to be sprayed, (2) the vapor pressure of the fluid at that particular temperature, and (3) the critical temperature and pressure of the fluid, but which is in its gaseous state at the standard conditions of zero degrees Celsius temperature and one atmosphere absolute pressure. As used herein, a "supercritical fluid" is a material that is at a temperature and pressure such that it is at, above, or slightly below its critical point. As used herein, the critical point is the transition point at which the liquid and gaseous states merge into each other and represents the combination of the critical temperature and critical pressure for a given substance. The critical temperature as used herein is defined as the temperature above which a gas cannot be liquefied by an increase in pressure. The critical pressure as used herein is defined as that pressure which is just sufficient to cause the appearance of two phases at the critical temperature.

Examples of viscosity reducing materials which may be employed as supercritical fluids in the process of the invention include, but are not necessarily limited to, carbon dioxide, ammonia, nitrous oxide, xenon, krypton, chlorotrifluoromethane, monofluoromethane, methane, ethane, ethylene, propane, and pentane. The critical parameters of these materials are listed in Table 1.

TABLE 1

Critical Parameters of Supercritical Fluids

| Compound | Boiling Point (°C.) | Critical Temp. (°C.) | Critical Pressure (bar) | Critical Density (g/ml) |
|---|---|---|---|---|
| Carbon Dioxide | −78.5 | 31.3 | 72.9 | 0.448 |
| Ammonia | −33.35 | 132.4 | 112.5 | 0.235 |
| Nitrous Oxide | −88.56 | 36.5 | 71.7 | 0.45 |
| Xenon | −108.2 | 16.6 | 57.6 | 0.118 |
| Krypton | −153.2 | −63.8 | 54.3 | 0.091 |
| Chlorotrifluoromethane | −31.2 | 28.0 | 38.7 | 0.579 |
| Monofluoromethane | −78.4 | 44.6 | 58.0 | 0.3 |
| Methane | −164.0 | −82.1 | 45.8 | 0.2 |
| Ethane | −88.63 | 32.28 | 48.1 | 0.203 |
| Ethylene | −103.7 | 9.21 | 49.7 | 0.218 |
| Propane | −42.1 | 96.67 | 41.9 | 0.217 |
| Pentane | 36.1 | 196.6 | 33.3 | 0.232 |

Examples of viscosity reducing materials which may be employed as high pressure subcritical compressed fluids include, but are not necessarily limited to, carbon dioxide, ammonia, nitrous oxide, xenon, chlorotrifluoromethane, monofluoromethane, ethane, and propane.

Carbon dioxide ($CO_2$) and nitrous oxide ($N_2O$) are preferred viscosity reducing materials for the practice of the present invention due to their low critical temperatures, low toxicities, nonflammability, and low cost. Carbon dioxide is the most preferred viscosity reducing material because of its low cost, availability, and environmental acceptability. Mixtures of any of the above mentioned materials are also within the scope of the invention.

The purpose of the viscosity reducing material is to reduce the viscosity of the mixture of polymer additive and liquid carrier to a point where it is sprayable, thus permitting relatively high levels of additives to be used in the composition to be sprayed, and to provide this function in an environmentally benign way. To fulfill this function, the viscosity reducing material must be a fluid under the system conditions of temperature and pressure, at least partially soluble in the liquid carrier, and present in an effective amount. Since it is not intended that the viscosity reducing material become part of the treated plastic, it should be volatile.

The step of spraying may be accomplished using any appropriate equipment capable of handling and spraying mixtures of liquids and solids under pressure.

The process of the invention may be employed to introduce plastics additives into or onto any polymeric material, those with low surface energies being preferred. Examples of polymeric materials which may be treated are the following: polyolefins such as high density polyethylene (HDPE), linear low density polyethylene (LLDPE), low density polyethylene (LDPE), polypropylenes, polyacrylates and polymethacrylates, poly(vinyl chloride), and polystyrene; polyesters; polyamides such as nylons; cellulose acetates; polycarbonates; and crystalline and elastomeric copolymers of ethylene with propylene and/or other $C_3$–$C_8$ straight or branched chain alpha olefins such as 1-butene, 1-pentene, 1-hexene, 1-octene, 4-methyl-1-pentene, 3-methyl-1-butene; terpolymers of alpha olefins and dienes; acrylonitrile-butadiene-styrene terpolymers; heterophasic polymers of propylene and other olefin polymers and/or copolymers; and mixtures thereof. Numerous other materials will occur to those skilled in the art. The process is most useful for introducing additives into polymeric materials which are in solid form, and preferably in particulate form.

Figure 1:
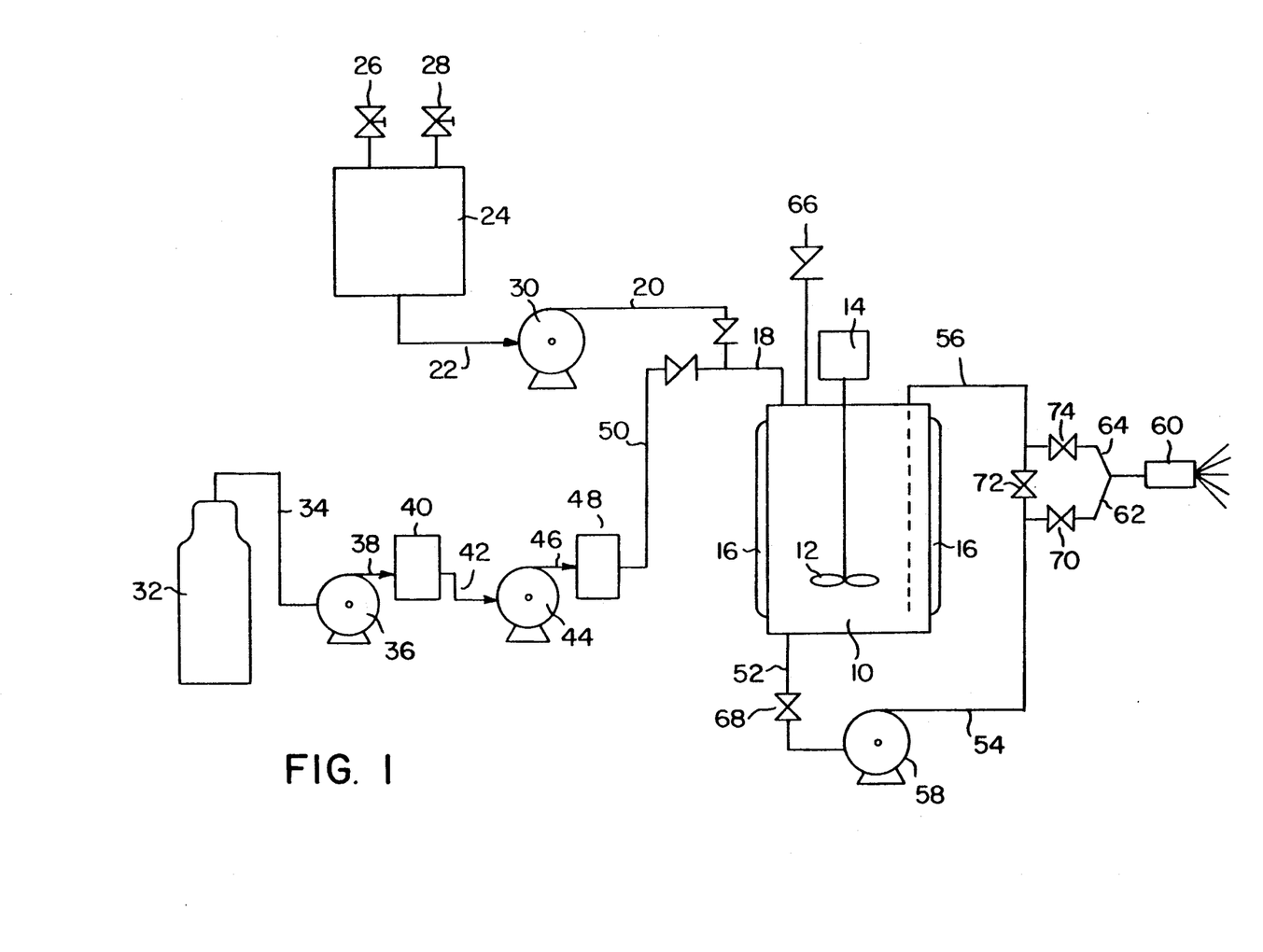
FIG. 1 is a schematic diagram of apparatus which may be employed in the spray process of the invention.

FIG. 1 shows a schematic diagram of apparatus suitable for practicing the spraying process of the invention in a batch mode. A pressurizable mixer 10 is equipped with means for mixing 12 which may be driven by a motor 14. Pressurizable mixer 10 is additionally provided with heating means 16. Attached to mixer 10 via lines 18, 20, and 22 is a tank 24 for holding a mixture of materials to be sprayed. Tank 24 is provided with an air inlet 26 and a vent 28. A pump 30 such as a gear pump is provided between lines 20 and 22 to move material to be sprayed from tank 24 into mixer 10. Also attached to mixer 10 is a container 32 of viscosity reducing material, container 32 being connected via line 34 to a gas booster pump 36, the output of which is connected via line 38 to a surge tank 40, which is in turn connected via line 42 to a liquids pump 44 whose output is connected via line 46 to a second surge tank 48, the output of which is connected via line 50 to line 18 and thence into mixer 10. Mixer 10 may optionally be provided with a recirculating loop shown in the figure by lines 52, 54, and 56. Pump 58 is provided in the recirculation loop for recirculating the contents of mixer 10, and sprayer 60 is connected to the recirculation loop via lines 62 and 64. Mixer 10 is also provided with pressurization means 66, such as, for instance, a source of nitrogen gas. If a recirculating loop is not used, mixer 10 is connected to sprayer 60 via lines 56 and 64 and valve 74, and lines 52, 54, pump 58, and values 68, 70 and 72 are either absent or shut down.

Figure 2:
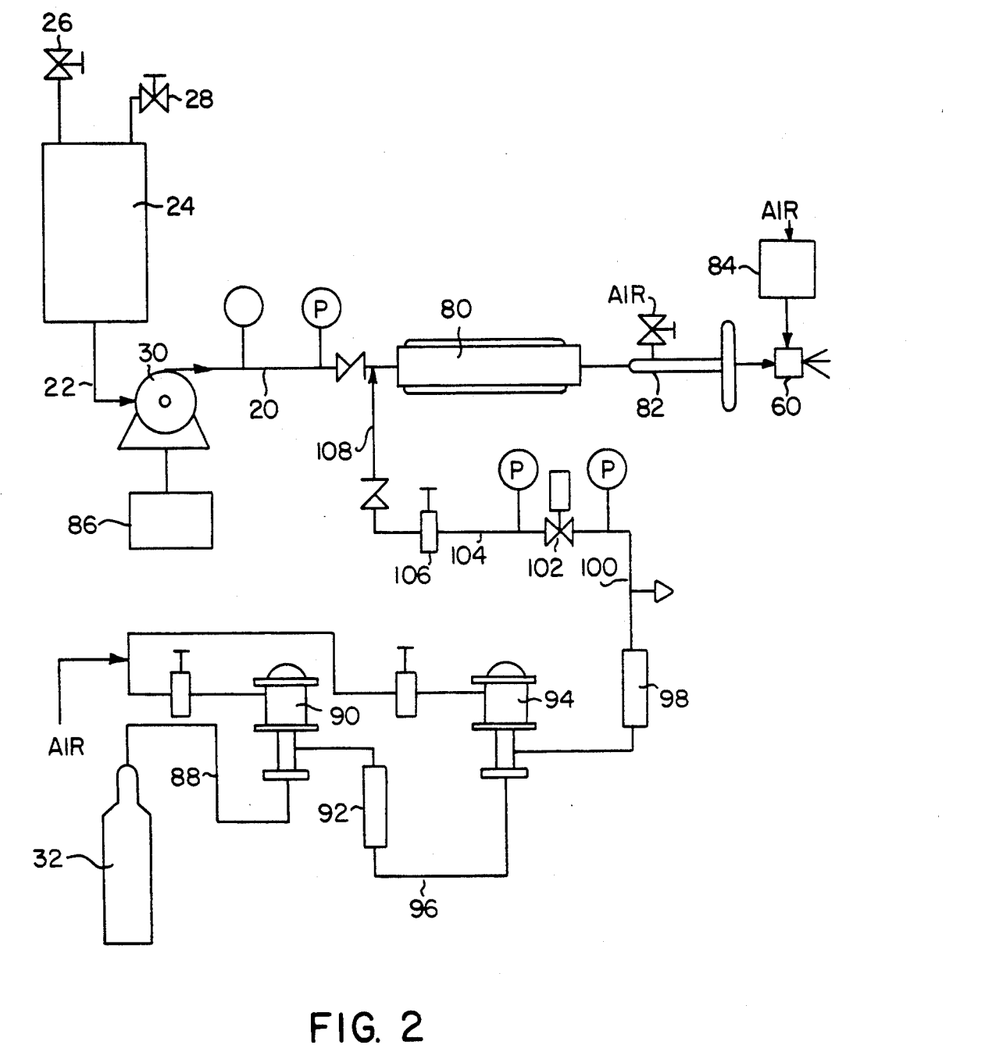
FIG. 2 is a schematic diagram of apparatus for continuous spraying.

FIG. 2 shows an alternative spraying apparatus, for continuous spraying. In this unit a jacketed static mixer 80 is employed for mixing the additive slurry with the viscosity reducing material. Following mixer 80 is an air driven power mixer 82 which is in turn connected to sprayer 60, which in this instance is controlled by an air operated solenoid and timer 84. Depending on the material being sprayed, it may only be necessary for the spray apparatus to possess one mixer, 80 or 82. In a single mixer apparatus, mixer 80 is preferred. As before, the mixture of materials to be sprayed is held in tank 24, which is provided with an inlet 26 and a vent 28. Tank 24 is connected via line 22 to pump 30, which is in this instance connected to a variable speed drive 86. The outlet of pump 30 connects to line 20, which is in turn connected to static mixer 80. A container 32 of viscosity reducing material is connected via line 88 to the inlet of an air driven gas booster pump 90, which is in turn connected to a small surge tank 92, which is connected to an air driven liquids pump 94 via line 96. This is in turn connected to a second small surge tank 98 which is connected via line 100 to a needle valve 102. The exit side of needle valve 102 is connected via line 104 to a back pressure regulator 106, which is in turn connected via line 108 to line 20 leading into static mixer 80.

Examples of processing equipment used for mixing include, but are not limited to, static mixers, power mixers, and other mechanical mixing devices, as well as recirculators for use with a closed system. Examples of mechanical mixing devices are the Kenics Static Mixer model 37-08-135 and the Graco Hydra-Cat Power Mixer model 207-388 series F. Pumps 30 and 58 are preferably gear pumps such as those made by Viking and Zenith. Pumps 36 and 44 of FIG. 1 correspond to pumps 90 and 94 of FIG. 2. The gas booster pumps 36 and 90 are preferably air driven gas booster pumps such as those made by Haskel. Liquids pumps 44 and 94 are also preferably but not necessarily air driven. Heating of process fluids can be provided for in any of the various ways known to the art, or in the case of a static mixer, a heating jacket may be employed as illustrated. Close coupling of the mixing apparatus to the spraying operation is preferred to maintain well mixed fluid for spraying. This is particularly important when the viscosity reducing material is used in an amount higher than is soluble in the mixture of polymer additive and liquid carrier.

Examples of spray units include, but are not limited to, the plural component or airless types manufactured by Binks, Nordson, Graco, and Spraying Systems.

Examples of apparatus which may be employed to handle the polymeric materials being spray treated include ribbon blenders, Henshall mixers, a resin drop zone, and a conveying line.

Referring to FIG. 1, in practice, one or more polymer additive materials are suspended or dispersed in a liquid carrier material to form a mixture having a paste-like consistency. This is initially charged to tank 24, from which it is conveyed through lines 22, 20, and 18 into mixer 10. Mixer 10 is sealed and pressurized, and viscosity reducing material from container 32 is introduced to mixer 10 under pressure and there mixed with the polymer additive material and liquid carrier material to form a sprayable composition. Spraying may be carried out with or without the circulating loop. Where the circulating loop is employed, valves 68, 70, and 74 are open and valve 72 is closed. When the circulating loop is not employed, valves 68, 70, and 72 are closed and valve 74 is open.

The operation of the apparatus shown in FIG. 2 is substantially similar to that of FIG. 1, except that the materials to be sprayed are provided continuously to mixers 80 and/or 82. The viscosity reducing material, preferably $CO_2$, is preferably supplied as a liquid from any suitable source, such as a cylinder or tank. It is pressurized by the gas booster pump, then pressurized by the liquids pump to a final desired pressure. Surge tanks are placed in the delivery line to dampen the flow and pressure pulsations resulting from intermittent flow from the reciprocating pump. The flow rate of the viscosity reducing material is adjusted by setting the air pressure to the liquids pump, adjusting the needle valve 102, and adjusting the back pressure to control the flow through the needle valve. The back pressure regulator is adjusted above the desired spraying pressure to allow for $CO_2$ delivery and mixing with the slurry. Additional apparatus for measuring and controlling $CO_2$ flow rate to the system may also be included.

Low average spraying rates using the apparatus of FIG. 1 or FIG. 2 can be maintained by intermittent spraying, rapidly opening and closing the spray orifice in sprayer 60, as illustrated in FIG. 2. Such intermittent operation of the sprayer can be achieved by air operated solenoids or electronic solenoids in an automatic spray gun assembly. Cycle rates of 180 cycles per minute are commercially available with air operated solenoids, and cycle rates up to 1800 cycles per minute are commercially available with electronic solenoids. Sprayers with good positive shutoff control are preferred for this intermittent mode of operation.

In the inventors' experience, a Nordson automatic spray gun gives the most preferred intermittent spray operation.

Upon being sprayed in accordance with the process of the invention, many of the solid polymer additive materials undergo substantial particle size reduction, which improves the potential for obtaining uniform coatings of the additives on polymer particles being treated. The superior dispersion ultimately achieved in the resin enables the desired degrees of polymer stabilization to be achieved at lower levels of added stabilizers than would be required if the stabilizers were added by other means.

An alternative means for providing finely divided solid additives for coating polymer particles is to subdivide the additive materials in a process such as dry or wet milling prior to spraying them onto the polymer. However, pumpable slurries containing small particle size solids are more viscous than slurries containing an optimized size distribution of solid particles, thus presenting practical difficulties in conveying slurries containing high concentrations of such small additive particles. The additive particle size reduction which can be achieved for many solid plastics additives in the process of this invention thus allows for delivery of additive mixtures in which the initial slurry can be optimized for maximum solids loading, while ultimately producing spray which contains solid particles of plastics additives in a much reduced particle size.

The process of the invention is not restricted to mixtures of one polymer additive, one liquid carrier material, and one viscosity reducing material. The ultimate mixture to be sprayed onto the polymeric substrate may include multiple solid plastics additives, multiple liquid carrier materials, and multiple viscosity reducing materials. It may also optionally include one or more liquid additive components. The mixture to be sprayed may originate as one or more stable slurries of plastics additives and liquid carrier materials, which are combined to form the ultimate sprayable mixture. When several slurries of additives are to be combined, this may readily be accomplished by having each in a separate holding tank and introducing it via its own pumping system and transfer line. Other variations on the theme will occur to those skilled in the art.

The pressure to be employed in the process of the invention needs to be high enough to allow production of a thinned effervescent spray from the additive mixture. Operating pressure may be in the range of 13.8 to 346 bar, preferably 35.5 to 208 bar, and most preferably 49.3 to 139 bar.

The temperature to be employed in the process may range from ambient to the stability limit of the materials being sprayed, preferably from ambient temperature to 100° C., and most preferably from ambient temperature to 60° C. Increasing temperature reduces the viscosity of the mixture to be sprayed, thus increasing the spray quality.

The concentration of solid plastics additives in the slurry of additive and liquid carrier material, prior to addition of the viscosity reducing material, may range from low values such as 5% by weight, to as high as approximately 70% by weight. Slurries containing solids loadings above 70% by weight are not readily pumped or metered. Slurries containing low solids concentrations need to be manufactured in a form that is gravametrically stable or settling and variation of mixture concentrations can result. Alternatively, unstable suspensions can be mixed just prior to spraying. The preferred range of solids concentrations for the slurry is 15% to 70% by weight, and the most preferred range is 25% to 65% by weight.

The size of the spray nozzle of sprayer 48 needs to be large enough to allow slurry particles to pass through without plugging. The minimum nozzle size will depend on the size of the largest particles in the slurry. Large orifice nozzles are preferred to minimize the chance for orifice plugging, and to allow for spraying of slurries which contain large particles. Smaller orifice sizes are preferred for maintaining low continuous flow rates. The spray nozzle orifice may typically be in the range of 0.13 to 5.1 mm; more typically it will be in the range of 0.18 to 2.5 mm.

The particle size of the polymer additive materials employed in the process can range from less than 1 micron to 2,000 microns, preferably from less than 1 micron to 1,000 microns, and most preferably is less than 1 to 200 microns. A slurry mixture containing the proper ratio of coarse to fine particles allows for the highest concentration slurry that can be pumped or will flow. Very coarse materials will plug nozzles and should be avoided. If the particle size of the polymer additive material is too large, the additive should be milled or micronized or otherwise reduced in particle size.

The concentration of the viscosity reducing material to be employed in the process of the invention needs to be high enough to allow spraying of the mixture of polymer additive material and liquid carrier. This amount will increase with increasing solids concentration and decreasing temperature. The mixture to be sprayed may contain viscosity reducer at levels above the solubility limit of the viscosity reducer in the mixture of the polymer additive and liquid carrier. The solubility limit of the viscosity reducer and the additive mixture will depend on several parameters, including the solids concentration, liquid carrier type, temperature, and pressure. In general, the viscosity reducing material may be employed at levels from 0.05 to 5 kg per kg of the additive mixture to be sprayed, preferably 0.10 to 1 kg per kg of additive mixture to be sprayed, and most preferably from 0.15 to 0.6 kg per kg of the mixture to be sprayed.

EXPERIMENTAL

Listing of Chemicals and Equipment

The model SS-1ST 3000 Test Cell was purchased from J. M. Canty Associates, Inc., 117 Cornwall Avenue, Tonawanda, N.Y. 14150.

Carrier Liquid 1 was UCARSIL® PA-1 processing aid, which is an organomodified polydimethylsiloxane manufactured by Union Carbide Chemicals and Plastics Company Inc.

Carrier Liquid 2 was UCON® LB-285 lubricant, which is a polyalkylene glycol available from Union Carbide Chemicals and Plastics Company Inc.

Vitamin E was purchased from Aldrich and was 97% pure.

Antioxidant 1 is a substituted phenol, more particularly, 1,3,5-trimethyl-2,4,6-tris(3,5-di-tert-butyl-4-hydroxy-benzyl)benzene, available from Ethyl Corporation.

Antioxidant 2 is a substituted phenol, more particularly, 2,2'-ethylidene-bis(4,6-di-tert-butylphenol), available from Schenectady Chemicals, Inc.

Stabilizer 1 is a phosphite, more particularly, tris-(nonylphenyl)phosphite with triisopropanolamine stabilizer, available from Borg-Warner Corporation.

Stabilizer 2 is a phenol, more particularly, tetrakis[-methylene-3(3',5'-di-tert-butyl-4'-hydroxyphenyl)propionate]methane, available from Ciba Geigy.

Stabilizer 3 is a is a phosphite, more particularly, tris-(2,4-di-tert-butylphenyl) phosphite, available from Ciba Geigy Corporation.

Stabilizer 4 is a phosphite, more particularly, bis-(2,4-di-tert-butlyphenyl) pentaerythritol diphosphite, available from Borg-Warner Corporation.

Stabilizer 5 is a substituted phenol, more particularly, octadecyl-3,5-di-tert-butyl-4-hydroxyhydrocinnamate, available from Ciba Geigy Corporation.

The particle analyzer was a Leeds and Northrup Microtrac TM FRA, which operates on the principle of laser diffraction and Mie light scattering.

EXAMPLE 1

Solubility of $CO_2$ in Carrier Liquid 1

Solubility of $CO_2$ in Carrier Liquid 1 was determined with a model SS-1ST 3000 test cell from J. M. Canty Associates, Inc. This test cell includes a high pressure viewing port and is rated at 3000 psig (207.9 bar). The test cell was charged with 25.4 grams of Carrier Liquid 1, liquid $CO_2$ was added at room temperature (25° C.) until two separate liquid phases were observed through the cell's viewing port sight glass, and then the cell was vented until a single liquid phase remained. The test cell was next slowly depressurized through a wet test meter used to determine gas flow. A $CO_2$ solubility of 30–40 weight percent in the Carrier Liquid 1 was estimated from this procedure. In addition, a volumetric increase of about 50% relative to the untreated Carrier Liquid 1 was observed for the single liquid phase.

EXAMPLE 2

Solubility of $CO_2$ in Various Liquids at Room Temperature

Solubility of $CO_2$ in several additional liquids were measured as in Example 1. The liquids tested include Union Carbide's PEG-400 polyethylene glycol, Carrier Liquid 2, Vitamin E, and Stabilizer 1. Each of the liquids tested showed a $CO_2$ solubility in the range from 20-35 weight percent at room temperature and at the pressure where only one liquid phase was observed in the test cell.

EXAMPLE 3

Viscosity Reduction Trial with a Mixture of Stabilizers

A slurry of 22 wt. % of Stabilizer 2, 43 wt. % of Stabilizer 3, and 35 wt. % of Carrier Liquid 1 was placed in the test cell, $CO_2$ was added, and the temperature in the cell was raised to 32° C., a point where a second $CO_2$-rich phase was not observed in the test cell. The slurry phase thinned significantly so that it could now be agitated like a liquid. From observing the slurry, it was judged that pumping could be accomplished. Spraying feasibility was not determined from these visual observations.

EXAMPLE 4

Spraying Trials

A plastic additives batch spray test apparatus according to FIG. 1 was used for determining the feasibility of spraying plastic additives using high pressure $CO_2$. The first test was carried out with a mixture of 2050 g of Carrier Liquid 2 and 570 g of coarsely ground Stabilizer 2. The particle size of the coarsely ground material was about 25-30 microns. This mixture was placed in the autoclave, 940 g of $CO_2$ was added, and the mixture was heated to 50° C. The spraying temperature was 47° C. and spray pressure was maintained at 1230 psig (85.8 bar). A 0.33 mm orifice spray tip (Binks 013-150025) functioned well with the above operating conditions. A second spray nozzle (Binks 9-1360) of 0.23 mm orifice also functioned satisfactorily. A spray rate of 41 pounds per hour (18.6 kg per hour) was measured using the 0.23 mm spray nozzle.

EXAMPLE 5

Additional Spraying Trials

Several additional slurry recipes were made and tested in the batch spray test apparatus used in Example 4. The table 2 below gives a summary of the test results. In general, spraying became difficult as solids concentration increased, pressure decreased, temperature decreased and spray nozzle size decreased. Spray rates for several operating conditions were measured on a $CO_2$-free basis by collecting sprayed material in a vented 5 gallon (18.9 liter) plastic container.

TABLE 2

Spraying Trials

| % Solids | Solid Materials | Particle Size (Microns) | Carrier Liquid | Orifice Size (mm) | Nozzle Designation | Temp. (°C.) | Pressure (bar) | Sprayable? | Spray Rate (kg/hr) |
| --- | --- | --- | --- | --- | --- | --- | --- | --- | --- |
| 22 | Stabilizer 2 | 25 | 2 | 0.23 | Binks 9-1360 | 48 | 87.2 | YES | 19.1 |
| 22 | Stabilizer 2 | 25 | 2 | 0.33 | Binks 013-150025 | 48 | 87.2 | YES | |
| 50 | Stabilizer 2 | 25 | 2 | 0.33 | Binks 013-150025 | 48 | 92.4 | NO | |
| 50 | Stabilizer 2 | 25 | 2 | 0.43 | Graco 163-317 | 48 | 96.9 | YES | |
| 50 | Stabilizer 2 | 25 | 2 | 0.38 | Graco 163-315 | 48 | 96.9 | YES | |
| 50 | Stabilizer 2 | 25 | 2 | 0.38 | Graco 163-315 | 32 | 78.9 | YES | 25.9 |
| 50 | Stabilizer 2 | 25 | 2 | 0.38 | Graco 163-315 | 43 | 72.0 | YES | 20.9 |
| 50 | Stabilizer 2 | 25 | 2 | 0.38 | Graco 163-315 | 41 | 56.9 | PLUGS | |
| 65 | Stabilizer 2 | 25 | 2 | 0.43 | Graco 163-317 | 44 | 88.9 | PLUGS | |
| 65 | Stabilizer 2 | 25 | 2 | 0.51 | Graco 163-820 | 44 | 88.9 | YES | |
| 65 | Stabilizer 2 | 25 | 2 | 0.79 | Graco 163-431 | 44 | 88.9 | YES | |
| 28.3 | Stabilizer 2 | 25 | 1 | 0.23 | Binks 9-1360 | 46 | 96.2 | YES | |
| 28.3 | Stabilizer 2 | 25 | 1 | 0.33 | Binks 013-150025 | 46 | 96.2 | YES | |
| 62.5 | Stabilizer 2 | 25 | 1 | 0.43 | Graco 163-317 | 56 | 87.9 | YES | 43.2 |
| 62.5 | Stabilizer 2 | 25 | 1 | 0.51 | Graco 163-820 | 56 | 92.0 | YES | 33.6 |
| 60 | Mix 1 | 100 | 1 | 0.38 | Graco 163-315 | 53 | 92.0 | NO | |
| 60 | Mix 1 | 100 | 1 | 0.43 | Graco 163-317 | 53 | 90.7 | YES | 41.8 |
| 60 | Mix 1 | 100 | 1 | 0.43 | Graco 163-317 | 46 | 90.7 | YES | 53.8 |
| 60 | Mix 1 | 100 | 1 | 0.43 | Graco 163-317 | 37 | 70.3 | NO | |
| 60 | Mix 1 | 100 | 1 | 0.79 | Graco 163-431 | 39 | 71.3 | YES | 66.4 |
| 70 | Antioxidant 2 | | 1 | 0.79 | Graco 163-481 | 52 | 105.1 | YES | |
| 70 | Antioxidant 2 | | 1 | 0.43 | Graco 163-317 | 52 | 105.1 | NO | see (1) |
| 60 | Mix 1 | 100 | 1 | 0.43 | Graco 163-317 | 43 | 94.1 | YES | 37.3 |
| 60 | Mix 1 | 100 | 1 | 0.38 | Graco 163-317 | 45 | 72.0 | PLUGGED | |
| 60 | Stabilizer 2 | 100 | 1 | 0.79 | Graco 163-431 | 46 | 76.9 | YES | see (2) |
| 30 | Stabilizer 2 | 100 | 1 | 0.79 | Graco 163-431 | 38.5 | 104.5 | YES | 88.2 |
| 31 | Stabilizer 2 | 100 | 1 | 0.51 | Graco 163-820 | 38.5 | 104.5 | NO | |
| 55 | Antioxidant 1 | 100 | 2 | 0.48 | Graco 163-619 | 38 | 85.1 | NO | |
| 55 | Antioxidant 1 | 100 | 2 | 0.79 | Graco 163-431 | 40 | 88.6 | YES | |
| 50 | Mix 2 | | 1 | 0.48 | Graco 163-619 | 44 | 103.1 | YES | |
| 50 | Mix 2 | | 1 | 0.79 | Graco 163-431 | 40 | 80.3 | YES | |
| 50 | Mix 2 | | 1 | | Nordsen 30.08 | 47 | 75.5 | YES | 44.1 |

TABLE 2-continued

| % Solids | Solid Materials | Particle Size (Microns) | Carrier Liquid | Orifice Size (mm) | Nozzle Designation | Temp. (°C.) | Pressure (bar) | Sprayable? | Spray Rate (kg/hr) |
|---|---|---|---|---|---|---|---|---|---|
| 50 | Mix 2 | | 1 | | Nordsen 20.12 | 54 | 76.9 | YES | 28.2 |

Mix 1 Composition contains:
37.3% Stabilizer 2
22.7% Stabilizer 4
40% Carrier Liquid 1
(1) Spray gun plugged behind seat and not in nozzle. High solids for batch device.
(2) Significant buildup in autoclave.
(3) Mix 2 slurry contains:
25% Stabilizer 2 (Unground)
25% Stabilizer 3 (Unground)
50% Carrier Liquid 1

EXAMPLE 6

Demonstration of Low Average Flow Rate Using Intermittent Spraying

Spraying trials with solid antioxidants were conducted using an air operated spray gun operated in an intermittent spraying mode (Binks model 560, or a Nordsen air operated assembly). The opening and closing of the spray aperture was controlled by a three way solenoid valve attached to an ON/OFF timer. Average rates of spraying were established by selecting various values of the ON and OFF settings on the timer. Representative rates for several tests are summarized in Table 3 below. The spray assembly operated effectively without shutoff leakage problems. It is seen that low average spraying rates can be achieved readily by selecting appropriate settings on the ON/OFF timer.

TABLE 3

| Sample | Spray Temp (°C.) | Pressure (bar) | ON Time (sec) | OFF Time (sec) | Spray Tip Size (mm) | Spray Rate (kg/hr) |
|---|---|---|---|---|---|---|
| Mix 3 | 45 | 89.3 | 0.25 | 1 | 0.43 | 10.0 |
| Mix 3 | 45 | 82.4 | 0.25 | 1 | 0.48 | 10.5 |
| Mix 3 | 45 | 88.6 | 0.10 | 1 | 0.48 | 5.0 |
| Mix 4 | 45 | 88.6 | cont. | — | 0.46 | 35.2 |
| Mix 4 | 46 | 94.8 | 0.10 | 1 | 0.46 | 3.7 |
| Mix 5 | 47 | 94.8 | 0.25 | 1 | 0.38 | 5.6 |
| Mix 5 | 49 | 90.7 | 0.25 | 1 | 0.43 | 8.9 |
| Mix 5 | 47 | 107.2 | 0.25 | 1 | 0.43 | 12.2 |
| Mix 6 | 48 | 85.1 | 0.3 | 0.75 | 0.38 | 7.2 |
| Mix 6 | 48 | 85.1 | cont. | — | 0.38 | 23.6 |
| Mix 6 | 48 | 90.7 | cont. | — | 0.48 | 33.9 |

Footnotes for Table 3:
a) Mix 3 is 40% Carrier Liquid 2, 30% Stabilizer 2, and 30% Stabilizer 3, by weight.
b) Mix 4 is 45% Carrier Liquid 2, 27.5% Stabilizer 2, and 27.5% Stabilizer 3, by weight.
c) Mix 5 is 50% Carrier Liquid 2 and 50% Stabilizer 2, by weight.
d) Mix 6 is 40% Carrier Liquid 1, 37% Stabilizer 2, and 23% Stabilizer 4, by weight.

EXAMPLE 7

Demonstration of Particle Size Reduction of Stabilizer 2 Upon Spraying

It was qualitatively observed that after spraying a slurry of Stabilizer 2 in the batch spray equipment with $CO_2$, the sprayed slurry was changed physically from the initially charged feed slurry. The feed slurry was gritty and contained relatively large irregular additive particles, whereas the sprayed material was very smooth and creamy in texture. A further test was conducted to determine the particle sizes in the feed and sprayed additive slurries. A slurry mixture was made as follows:

| Component | Weight (g) | Concentration (wt. %) |
|---|---|---|
| Stabilizer 2 (unground) | 1200 | 30 |
| Stabilizer 2 (coarse ground) | 1200 | 30 |
| Carrier Liquid 2 | 1600 | 40 |

Samples of this mixture were diluted with dodecane and then analyzed for solids particle size using a Microtrac particle size analyzer. Dodecane was chosen as it was miscible with the Carrier Liquid 2 lubricant fluid and did not dissolve the solid additive particles. The feed material showed a bimodal particle size distribution with 35–45% of the particles above 100 microns in size and the bulk of the material having particle sizes of 25 to 100 microns. The samples were sprayed using the batch spray apparatus operating at 49° C. and 1275 psig (88.9 bar) through an 18 mil (0.46 mm) orifice. The collected sprayed material was very smooth and creamy and contained only 1–2% of material with a particle size larger than 100 microns; the particle size of the bulk of the sprayed material was in the range of 2–6 microns, as measured by the Microtrac particle size analyzer. The 50% cumulative volume particle size was reduced from 67–80 microns for the feed to 8–10 microns for material sprayed after 15 minutes circulation in the batch spray device.

Similar particle size reductions were observed for several additional solid plastic additive materials in the high pressure spray apparatus with $CO_2$. Materials with which size reduction upon spraying occurs include Stabilizer 2, Antioxidant 2, stabilizer 3, Stabilizer 4, and stabilizer 5.

EXAMPLE 8

Particle Size Reduction Trial of Antioxidant 1 Upon Spraying

A particle size reduction test was conducted for Antioxidant 1 in Carrier Liquid 2. A mixture containing 55% Antioxidant 1 (unground) and Carrier Liquid 2 was made and 3017 grams of the mixture was placed in the batch spray apparatus autoclave. The mixture was heated to 40° C. while stirring in the autoclave and system pressure was maintained at 1270 psig (88.6 bar) with $CO_2$. A total of 2100 grams of the test mixture material was sprayed through a spray nozzle to a collection jug. The collected sprayed slurry retained the gritty consistency characteristic of the feed slurry. Analysis of samples of the feed mixture and the sprayed material with the Microtrac particle size analyzer confirmed that no substantial overall reduction in particle size of the Antioxidant 1 had occurred upon spraying, though the numbers of particles in the size range 300 to 600 microns were much reduced. The $CO_2$ spraying system was not effective for reducing particle size of Antioxidant 1. The Antioxidant 1 particles are harder and more dense than Stabilizer 2 particles and several other solid additive materials.

EXAMPLE 9

Particle Shearing in a Power Mixer

Shear tests using an air driven power mixer, appended to the apparatus of FIG. 1, located in the feed line leading to the sprayer downstream of the stirred autoclave and before the sprayer, were carried out to further evaluate the impact of mechanical agitation, $N_2$, and $CO_2$ have on reduction of additive slurry particle size. The recirculation loop was not used. Four sets of tests were carried out using nitrogen and $CO_2$ for pressurizing/mixing in the autoclave prior to passing the test mixtures through the power mixer and a 41 mil drilled orifice. The power mixer (Graco model #207-388 with mixing assembly #207-390 (3 blades)) provided high shear mixing. The mixer was driven with compressed air and the mixer blades rotate at speed up to 2800 RPM. The chamber holding the mixing blades has a 2.1 cubic inch (34.4 cubic centimeter) volume holdup.

A total of 2700 grams of a mixture containing 25% of Stabilizer 2, 25% of Stabilizer 3 and 50% Carrier Liquid 1 was charged to the autoclave, the autoclave was presurized to 1000 psig (70.0 bar) with nitrogen, and the mixture was agitated two minutes in the autoclave with the autoclave mixer. The pressurized mixture was then allowed to pass through the power mixer (mixing blades not on) and was sprayed through the 41 mil (1.04 mm) orifice. A sample of slurry was collected as it was discharging from the orifice. Next, the power mixer was turned on and a second sprayed sample was collected. Both collected samples retained the gritty character of the feed material charged to the autoclave. The high speed mixing had little impact on slurry characteristics.

The nitrogen pressure on the autoclave was slowly released and $CO_2$ was added to the autoclave to give a pressure of 1000 psig (70.0 bar). The agitator in the autoclave was operated again for 2 minutes before the material was discharged through the orifice. Samples obtained with and without the power mixer running were both very smooth and creamy, indicative of significant size reduction of the solid additive particles. It is thus seen that a viscosity-reducing material such as $CO_2$, having the properties defined herein, is a preferred component for producing a spray which gives reduced additive particle size.

EXAMPLE 10

Demonstration of Slurry Spraying in a Continuous Feed, High Pressure Spray

A high pressure spray device was constructed to demonstrate spray operation when additive slurry and $CO_2$ are continuously fed and sprayed. The equipment used for the demonstration is shown in FIG. 2. The additive slurry was fed from a holding tank 24 to a gear pump 30 capable of 1500 psig (104.5 bar) pressure. The slurry was then combined with $CO_2$ and mixed in a 12 inch (30.5 centimeter) Kenics static mixer 80 prior to being sprayed. The initial demonstration tests were carried out at ambient temperature without additional heating. The spray apparatus was operated with the air driven power mixer 82 alternately on and off. A slurry containing 12.5% Stabilizer 2, 12.5% Stabilizer 3 and 75% Carrier Liquid 1 was mixed and placed in the feed tank 24. Other equipment parameters and operating conditions are listed below:

1) Slurry pump speed: 5 rpm
2) Slurry pump discharge pressure: 900-1250 psig (63.1-87.2 bar)
3) $CO_2$ pump pressure: 900-1200 psig (63.1-83.8 bar)
4) Temperature: Ambient (28° C.)
5) Spray tip: Graco 431 (0.79 mm orifice)
6) The spray gun was controlled with an air operated solenoid valve 84.
7) Timer setting for air solenoid: 0.2 sec ON, 0.35 sec OFF.

The intermittent operation of the spray gun resulted in pressure swings. These fluctuations in system pressure can be reduced by spraying continuously and/or by adjusting the surge capacity of the device downstream of the $CO_2$ and slurry mixing point. No significant difference in performance was observed when the power mixer was turned on. Observed spray quality was slightly better when the power mixer is turned on. The collected spray was smooth and creamy, again indicating a size reduction of solid additive particles during spraying.

EXAMPLE 11

Determination of $CO_2$ Solubility in Carrier Liquid 1

$CO_2$ solubility in the Carrier Liquid 1 portion of a slurry to be sprayed was determined by collecting spray exiting the spray nozzle in the high pressure batch spray device of FIG. 1. The spray nozzle was placed into a 5 gallon (18.9 liter) plastic jug and a vent line from the 5 gallon (18.9 liter) jug allowed evolved $CO_2$ to pass through a wet test meter where $CO_2$ gas volume was measured. Conditions for operation and $CO_2$ usage are given below:

Autoclave pressure: 1045 psig (73.1 bar)
Autoclave temperature: 54-55° C.
Recirculation pump discharge pressure: 1200 psig (83.8 bar)
Spray gun temperature: 50-51° C.
Slurry:
Stabilizer 2: 25% (unground)
Stabilizer 3: 25% (unground)
Carrier Liquid 1: 50%
Results are shown in Table 4 below.

TABLE 4

| Grams slurry collected | Volume $CO_2$ collected (liters) | Grams $CO_2$ per gram slurry |
| --- | --- | --- |
| 88 | 9.12 | 0.184 |
| 86 | 9.00 | 0.185 |
| 82 | 8.35 | 0.180 |
| 86 | 8.72 | 0.179 |
| | | Average: 0.182 |

The $CO_2$ measured compares favorably with what is expected to be soluble in the liquid portion of the slurry at operating conditions in the autoclave.

EXAMPLE 12

Effect of Varying the Amount of $CO_2$

The continuous spray apparatus of FIG. 2 was operated with varying ratios of $CO_2$ to additive slurry. A mixture of 50% carrier liquid 1, 25% stabilizer 2, and 25% of stabilizer 3, by weight, was employed for the additive slurry. Mixing was provided for several tests with a power mixer operating at high rpm just upstream of the spray assembly. Cycled ON/OFF spraying was used to allow for a low overall spraying rate from the assembly. A summary of operating conditions and ratios of $CO_2$ to slurry is given in Table 5 below. At temperatures less than 31.3° C., the $CO_2$ exists as a subcritical liquid. Above this temperature, it is a supercritical fluid. The amounts of $CO_2$ employed were in excess of the solubility limit for $CO_2$ in the suspensions. Thus, the mixtures sprayed contained two liquid phases. A Graco 431 (0.79 mm) orifice was utilized for this series of tests. Spray times from 2 to 11 minutes were run. Results are shown in Table 5 below.

TABLE 5

| Pressure (bar) | Temp (°C.) | Slurry flow rate (kg/hr) | $CO_2$ flow rate (kg/hr) | Lbs $CO_2$ per lb. slurry | ON/OFF cycle time |
|---|---|---|---|---|---|
| 70.0 | 18 | 8.0 | 4.3 | .534 | .15/2.0 |
| 87.2–90.7 | 21 | 7.8 | 2.2 | .285 | .125/2.25 |
| 83.8–94.1 | 23 | 6.6 | 2.6 | .396 | .125/2.25 |
| 87.2 | 23 | 7.4 | 2.5 | .34 | .125/2.25 |
| 87.2–101.0 | 21 | 7.6 | 4.0 | .524 | .125/2.25 |
| 56.2 | 21 | 7.8 | 0.9* | .119 | .125/2.0 |
| 56.2–57.9 | 20 | 7.4 | 2.6 | .359 | .125/2.0 |
| 52.7–59.6 | 21 | 6.9 | 2.4 | .353 | .125/2.0 |
| 47.9–57.9 | 22 | 6.8 | 1.6 | .240 | .125/2.0 |
| 56.2–57.9 | 21 | 8.6 | 2.2 | .256 | .125/2.0 |
| 54.8–56.2 | 21 | 7.6 | 2.5 | .324 | .125/2.0 |
| 76.9–80.3 | 33 | 7.4 | 4.2 | .567 | .125/2.0 |

*plugged

EXAMPLE 13

Particle Coating/Extrusion Trials

The batch spray apparatus of FIG. 1 was set up to allow spraying into a 3 cubic foot (0.085 cubic meter) ribbon blender. An amount of 74 pounds (33.6 kilograms) of polypropylene powder was placed into the ribbon blender. An additive slurry mixture containing 25% Stabilizer 2, 25% Stabilizer 3, and 50% Carrier Liquid 1 was placed into the autoclave. Spray conditions of 1060 psig (74.1 bar) and 50° C. were maintained. The ON/OFF cycle timers controlling the opening and closing of the spray gun were adjusted to 0.1 sec. ON and 4.95 sec OFF, to deliver an average flow rate of 3.8 lb/hr (1.725 kilograms/hr.) to the blender. Target levels of 800 ppm Stabilizer 2, 800 ppm Stabilizer 3, and 1600 ppm Carrier Liquid 1 were chosen to be delivered to the resin in the ribbon blender. The spray nozzle was located 8.5 inches (21.6 cm.) above the resin level in the ribbon blender, and was directed to spray near the center of the blender. The ribbon blender rotated at 60 RPM during the 208 sec spray time, and the rotation continued for another 10 minutes before being stopped. The blender contents were then discharged into a fiber drum. During discharge, four one gallon (3.8 liter) samples were taken and saved. The resin remained free flowing throughout the test and during discharge from the blender.

Another test was carried out by dry blending Stabilizer 2 and Stabilizer 3 with polypropylene powder. Target levels of 800 ppm Stabilizer 2 and 800 ppm Stabilizer 3 were chosen. A total of 68 pounds (30.9 kg) of polypropylene was charged to the ribbon blender. An additive blend containing 24.7 g Stabilizer 2, 24.7 g. Stabilizer 3, and 597 g of polypropylene (obtained from the 68 lb (30.9 kg) charge) was mixed well and continuously fed into the center of the operating blender over a 210 second time. The blender was again agitated for 10 minutes after the addition was complete.

Resin bulk density and particle size distribution were measured for the dry mixed and sprayed additive mixtures discharged from the ribbon blender. A particle size distribution, as measured by dry screening, is summarized below in Table 6:

TABLE 6

Dry Blended Polypropylene Powder

| Particle Size (Microns) | Weight of Sample Retained, gm | Percent of Sample Retained | Cumulative % Smaller Than Particle Size |
|---|---|---|---|
| 3360 | 10 | 2.32 | 97.68 |
| 2380 | 14 | 3.24 | 94.44 |
| 2000 | 14 | 3.24 | 91.19 |
| 1680 | 30 | 6.95 | 84.24 |
| 1190 | 60 | 13.90 | 70.34 |
| 707 | 137 | 31.75 | 38.59 |
| 595 | 29 | 6.72 | 31.87 |
| 297 | 103.5 | 23.99 | 7.88 |
| 210 | 17 | 3.94 | 3.94 |
| 177 | 8 | 1.84 | 2.09 |
| 149 | 4 | 0.93 | 1.16 |
| <149 | 5 | 1.16 | — |

Spray Blended Polypropylene Powder

| 3360 | 10 | 2.38 | 97.62 |
| 2380 | 14 | 3.33 | 94.29 |
| 2000 | 14 | 3.33 | 90.95 |
| 1680 | 23 | 5.48 | 85.48 |
| 1190 | 66 | 15.71 | 69.76 |
| 707 | 140 | 33.33 | 36.43 |
| 595 | 33 | 7.86 | 28.57 |
| 297 | 105.5 | 25.12 | 3.45 |
| 210 | 4 | 0.95 | 2.5 |
| 177 | 4.5 | 1.07 | 1.43 |
| 149 | 3 | 0.71 | 0.71 |
| <149 | 3 | 0.71 | — |

The bulk density of the additive free resin feed was 18.9 lb/cu.ft. (0.30 g/cc), whereas the bulk density of the spray mixed material was 22.2 lb/cu.ft. (0.36 g/cc), and the bulk density of the dry blended material was 20.2 lb/cu.ft. (0.32 g/cc). A product with a higher bulk density and less fine powder was observed for the sprayed additive test.

Next, a one gallon (3.8 liter) sample was compounded in a ¾ inch (1.9 centimeter) Braybender extruder. The sample was extruded at 230° C. Some extruded material was chopped into pellets and some was retained as ⅛ inch diameter "rope".

Uniformity of additive distribution was determined on a pellet to pellet basis using differential scanning calorimetry to measure oxidation induction time (DSC/OIT). The oxidation induction times for 20 pellets from each sample were determined. The averages and standard deviations are given below in Table 7:

TABLE 7

| | DSC/OIT Data | |
|---|---|---|
| Additive Delivery | Mean OIT (min) | Std. Dev. (min) |
| Dry Additive Blending | 44.9 | 28.1 |
| Sprayed Additive Blending | 30.0 | 7.8 |

It is clear that spraying affords much more uniform levels of addition on the resin than dry blending.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

We claim:

1. A process for applying a polymer additive material to a polymeric substrate, comprising the following steps:
   A) forming in a closed pressurized system a mixture comprising:
   1) at least one polymer additive material which is a solid under standard conditions of temperature and pressure;
   2) at least one liquid carrier material capable of dissolving, suspending, or dispersing said polymer additive material;
   3) at least one viscosity reducing material which is:
      i) a liquid under the pressure of said closed pressurized system,
      ii) at least partially soluble in said liquid carrier material,
      iii) present in said mixture in an amount which is effective to cause said mixture to have a viscosity which renders it sprayable, and
      iv) volatile under standard conditions of temperature and pressure, and
   B) spraying said mixture onto a polymeric substrate.

2. The process of claim 1 wherein said polymer additive material is selected from the group consisting of antioxidants, neutralizers, metal deactivators, slip agents, light stabilizers, antiblocking agents, colorants, lubricants, flame retardants, coupling agents, processing aids, antistatic agents, nucleating agents, and blowing agents.

3. The process of claim 2 wherein said liquid carrier material is selected from the group consisting of organomodified polydimethylsiloxanes, polyalkylene glycols, and polyethylene glycols.

4. The process of claim 1 wherein said viscosity reducing material is selected from the group consisting of supercritical fluids and subcritical compressed fluids.

5. The process of claim 4 wherein said viscosity reducing material is selected from the group consisting of carbon dioxide, ammonia, nitrous oxide, xenon, krypton, chlorotrifluoromethane, monofluoromethane, methane, ethane, ethylene, propane, and pentane.

6. The process of claim 5 wherein said viscosity reducing material is selected from the group consisting of carbon dioxide and nitrous oxide.

7. The process of claim 1 wherein in the spraying step said polymer additive material is reduced in particle size relative to its initial particle size.

* * * * *